United States Patent [19]

Hawkins et al.

[11] 3,963,855

[45] June 15, 1976

[54] BOLTLESS SPACER CLAMP

[75] Inventors: Ronald G. Hawkins; Charles R. Russ, both of Massena, N.Y.

[73] Assignee: Aluminum Company of America, Pittsburgh, Pa.

[22] Filed: Sept. 5, 1975

[21] Appl. No.: 610,527

[52] U.S. Cl............................ 174/40 R; 24/81 CC; 24/132 CS; 174/146
[51] Int. Cl.² .................................... H02G 7/12
[58] Field of Search............ 174/40 R, 128 BL, 146, 174/154, 155, 156; 24/73 CC, 81 CC, 132 CS, 132 SB, 132 WL, 248 B, 248 L, 248 SL

[56] References Cited
UNITED STATES PATENTS

| | | | |
|---|---|---|---|
| 2,915,580 | 12/1959 | Gill et al. | 174/146 X |
| 3,161,721 | 12/1964 | Torr | 174/146 X |

FOREIGN PATENTS OR APPLICATIONS

| | | | |
|---|---|---|---|
| 1,554,379 | 12/1968 | France | 174/146 |
| 1,223,110 | 2/1971 | United Kingdom | 174/146 |

Primary Examiner—Laramie E. Askin
Attorney, Agent, or Firm—Elroy Strickland

[57] ABSTRACT

An inexpensive boltless device for spacing at least two parallel, spaced apart conductors. The device comprises rigid clamping structures adapted to be secured together and to the conductors by two U-shaped resilient metal clamps. At least one of the clamping structures has two outwardly facing planar ledges inclined inwardly toward each other. The resilient clips have planar leg portions provided with angularly directed extensions shaped to extend over and respectively engage the inclined planar surfaces when the clamping structures are placed together and the clips are disposed over the clamping structures.

11 Claims, 8 Drawing Figures

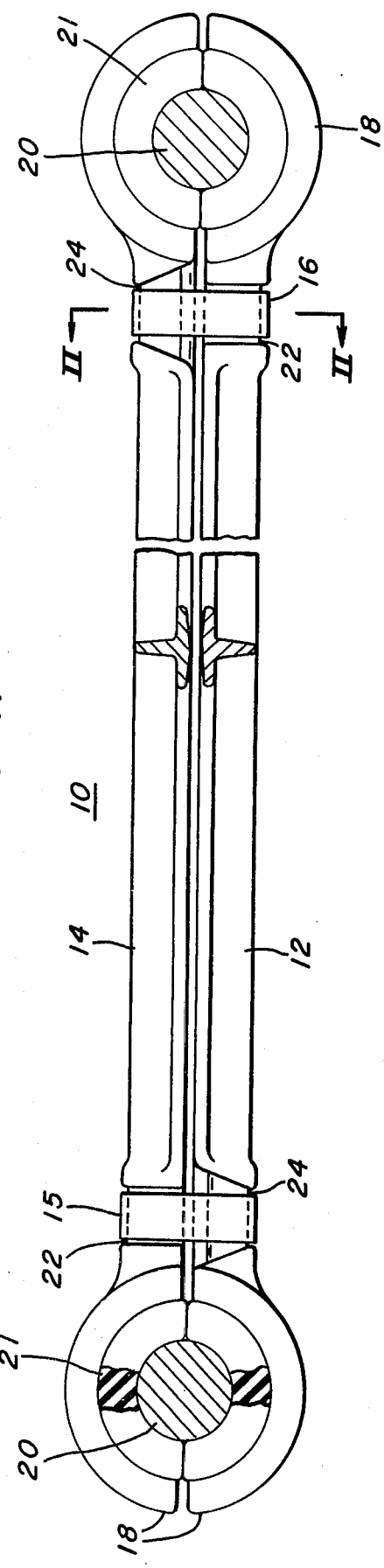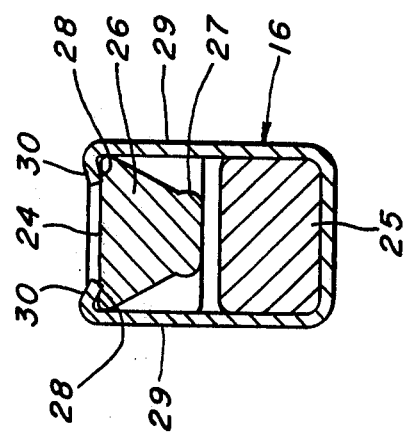

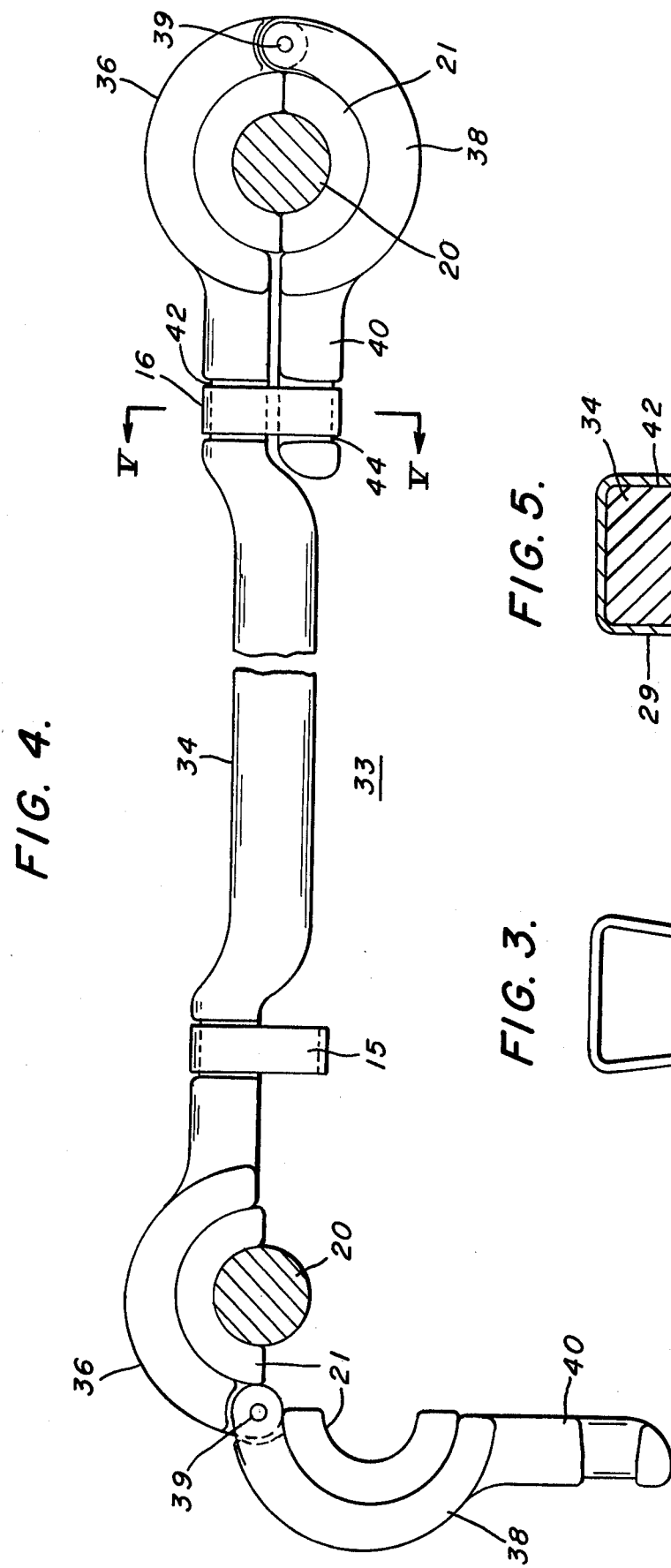

BOLTLESS SPACER CLAMP

BACKGROUND OF THE INVENTION

The present invention relates generally to devices for spacing overhead parallel conductors, and particularly to a rigid bar device adapted to be clamped to and between the conductors by resilient metal clips in a simple and economical manner.

Since the beginning of the use of spacers for spacing the subconductors of overhead conductor bundles, the spacers have generally employed clamps having threaded bolts to attach each spacer to the subconductors. The use of bolts has presented the problem of determining whether or not the bolts are in fact tight and the clamps thus properly secured to the conductors. For the person inspecting the spacer and clamps, the bolt and clamps might appear tightly installed but in reality, they might be quite loose such that the clamp on the conductor wears the conductor before the spacing device eventually falls from the line.

On the other hand, the lineman installing the spacer might overtighten the bolt, which can leave the bolt in a partially fractured condition. As soon as certain loads are placed on the spacer, such as might occur with strong winds and/or substantial motions of the conductor, the bolt breaks leaving the clamp loose (again) on the conductor. A partial solution to the problem of overtightening has been the use of a bolt with a breakaway head. When the bolt is tightened to a designated torque, the head shears off thus furnishing the personnel installing the spacer with an obvious indication of correct installation torque. Also, it provides ease of inspection from the ground, as the inspector would have only to visually determine that the breakaway head was in fact missing.

The breakaway head did not, however, wholly solve the problem of quick and accurate determination of whether or not a spacer clamp was properly secured and bolted to its associated conductor. Occasionally, the tapped hole in the casting of the clamp was under tolerance or simply had faulty threads. The bolt also might be in similar condition, and the threads of the bolt or the casting might have foreign matter on them. The installer, under these conditions, tightens the bolt, shears off the breakaway head, with the bolt having little, if any, tension in securing the clamp to the conductor. The result, again, is a loose clamp and, eventually, a damaged conductor.

In addition to the above problems, an inadequate clamp design can result in properly installed bolts working loose. The conductor to which the bolt is attached, being subject to changing temperatures, expands and contracts. If the total area of the clamp bearing on the conductor is inadequate, the conductor material is compressed to a degree that the bolts of the clamps are allowed to work loose since such compression can result in the loss of considerable tension on the bolts of the clamps.

Further, there have even been instances when installers have failed to break off any of the breakaway heads of clamp bolts on entire sections of a transmission line, and inspectors have failed to observe such a condition.

Because of these problems with bolted clamps, purchasers of such clamps, such as power and transmission line companies, have opted for conductor clamping devices that do not use threaded bolts.

A device for spacing overhead conductors that does not require threaded bolts is shown in the U.S. Gill et al Pat. No. 2,915,580. This device comprises two cast bars having opposed pins and pin receiving holes in the bars, as well as dove-tail slots for receiving dove-tail keys to secure the bars together. It will be noted that to install such a device, an application of forces directed at 90° to each other is required to compress the bars on the conductors and to insert the dove-tail keys into the slots in the bars. Under severe conditions, and operating from a cart suspended from the conductors high above the ground, the application of such perpendicular forces might not be easily accomplished in the process of installing the Gill spacer.

In addition, the keys of the Gill structure might appear, from the ground, to be fully inserted and secure within the bar slots but in fact they may not be fully inserted and secure. For this reason, the degree of assurance of proper attachment is similar to that of the bolted structures discussed above.

Another device for spacing overhead conductors that does not require the use of threaded bolts is shown in U.S. Torr Pat. No. 3,161,721. The Torr device utilizes a pin extending through two half portions of a conductor clamp, the pin having at one of its ends a head for engaging one clamping half and a transverse cotter extending through the pin to overlie the other clamping half when the clamping halves are disposed in clamping position. While avoiding certain of the above-discussed problems associated with threaded bolts, the structure of Torr requires certain manufacturing steps and costs and is susceptible to only partial securance of the clamp to the conductor so that a thoroughly doubt-free clamping mechanism is still needed in the conductor spacing art.

BRIEF SUMMARY OF THE INVENTION

The present invention provides an inexpensive, easily installed spacing device which does not require the use of bolts or keys and does provide the needed doubt-free assurance that a conductor clamp and spacer is properly secured to the conductor. In one embodiment of the invention, this is accomplished by the use of two rigid and substantially identical spacing bars having integral conductor clamping halves at each end. The bars are first placed together with the clamping halves located around the conductors, the bars then being clipped together by two resilient metal clips conforming substantially to a cross-sectional configuration of the bars. At least one of the bars is provided with opposed, inwardly inclined planar ledges, and the clips are provided with two leg portions each having planar extensions adapted to extend over and engage the two planar surfaces after the clips are disposed around the bars. When the inward extensions engage or seat over the planar ledges, a snap is heard so that the installer knows that the structures are secured together on the conductors.

Before the installation of the spacer of the subject invention, the clips can be disposed over one of the bars and thereby be in position to be readily disposed in clipping engagement with the other bar. To facilitate clipping the bars together, the other bar may have a wedge-shape configuration in cross section such that the wedge functions to spread the legs of the clips apart as the bars are brought together in the process of securing the bars to the conductors and to each other.

The simplicity and efficiency of the device is such that a single workman can easily and quickly install the device (by a single push motion) even when working from difficult positions and locations. In this regard, the device is easily provided with a feature that permits the installer to pre-position the clip by hand before it is snapped into final clipping position by a suitable tool.

The spacer of the invention requires a minimum of parts that are inexpensive to make. The bars, with their integral clamp halves, for example, have no internal holes or slots that require difficult flash removal or drilling operations and can be identical units cast in their finished configuration so that no machining at all is required.

THE DRAWINGS

The invention, along with its objectives and advantages, will be better understood after consideration of the following detailed description and the accompanying drawings in which:

FIG. 1 is a side elevation view of a conductor spacing device constructed in accordance with the principles of the present invention;

FIG. 2 is an enlarged, cross-sectional view of the device of FIG. 1 taken along lines II—II in FIG. 1;

FIG. 3 is an end elevation view of the clip employed in the invention;

FIG. 4 is a side elevation view of an alternative embodiment of the invention;

FIG. 5 is an enlarged, cross-sectional view of the device of FIG. 4 taken along lines V—V of FIG. 4;

PREFERRED EMBODIMENTS

Figure 6:
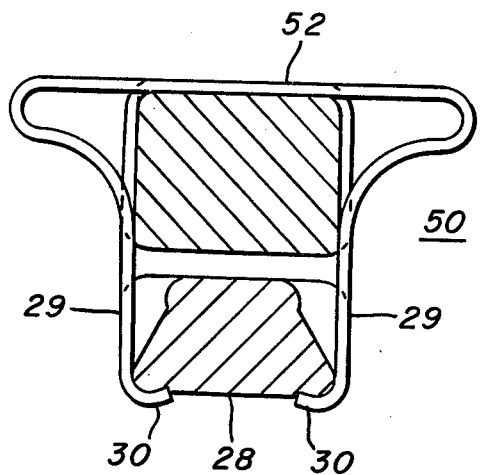
FIG. 6 is an elevation view of an alternative embodiment of the clips shown in FIGS. 1 to 5.

Referring now to the drawings, FIG. 1 thereof shows, in side elevation, one embodiment of the spacing device of the invention, designated by numeral 10, which comprises two elongated, rigid bars 12 and 14 preferably of identical construction, clamped together by two, relatively narrow width spring metal clips 15 and 16. The metal clips are located near integral clamp halves 18 of the bars, the clamp halves being located at opposed ends of the bars. The clamp halves are dimensioned and configured to extend around parallel conductors 20 when the bars are placed together in face-to-face, clamping relationship, as shown in FIG. 1. Between the clamp halves and the conductors are located resilient, relatively thick bushings 21, the bushings being in the form of bushing halves separately seatable and retained in the clamp halves.

Each of the bar structures, at the locations of clips 15 and 16, may be provided with indented portions or indents 22 and 24 for the purpose of providing a relative even profile on the bar surfaces when the clips are installed, properly locating and securing the clips to the bars, and for maintaining the axial position of the clips on the bars after the bars are installed on the conductors 20 and the clips snapped into place on the bars. It will be noted that the indents 22 and 24 on each bar are adjacent opposed ends of the bars so that, when the two bars are placed together in the manner shown in FIG. 1, the relative vertical disposition of indents 22 and 24 is reversed.

As seen in the sectional view of FIG. 2, the indent 22 in each spacer bar provides the bars, at the locations of each indent 22, with a cross-sectional configuration that is different from that provided by indents 24. More specifically, indent 22 at the right hand end of bar 12, which bar is the lower bar in FIGS. 1 and 2, provides the cross section of bar 12 at that location with a generally rectangular portion 25, with rounded corners, as best seen in FIG. 2, while the indent 24 of bar 14 provides this bar with a generally wedge-shaped portion 26 (in cross section), the wedge-shaped portion having its narrow dimension extending inwardly in the direction of the other bar (12).

In addition, still referring to the view of FIG. 2, the narrow face of wedge-shape 26 may have an initial bulge 27, with rounded corners, while the outer face of the wedge is provided with opposed, planar ledges 28 that are inwardly inclined toward each other and toward the narrow face of the wedge.

Each of the two clips 15 and 16 is made from flat metal spring stock, and each has generally a U-shaped configuration (in cross section) dimensioned to conform to the generally rectangular configuration of the bar portions provided by indents 22, as seen in FIG. 2. Similarly, the general U configuration of the clip provides the clip with planar legs 29 which are dimensioned lengthwise to extend to the ledges 28 of the indented portion 24, which is opposite indent 22 when the bars are placed in face-to-face, clamping relation. Further, the ends of each leg 29 are provided with inwardly extending planar portions 30, which portions are also inclined inwardly in the manner of ledges 28, i.e., planar portions 30 are formed by being bent back to a 90° location with respect to the planes of legs 29. As manufactured, and in their relaxed condition, the legs of both clips are inclined inwardly toward each other such that the inward extensions 30 almost contact each other, as best seen in FIG. 3.

In addition, the configuration of each clip, with its planar legs 29 in line contact with associated surfaces of rectangular portions 25 of the bars, is such that it does not tend to rotate. If the clips are disposed in indents 22 of each bar at a factory location, for example, this matching configuration of the bars and clips insures that the clips will be in the correct position for securing the bars together in a manner presently to be explained.

To secure spacer bars 12 and 14 to the parallel conductors 20, the bars 12 and 14 are brought together in face-to-face relationship between the conductors in a manner that places indents 22 and 24 in opposed positions. This places the integral clamp halves 18, with bushing halves 21, about the conductors, as shown in FIG. 1, the lengths of the bars being chosen to span the distance between the conductors. As indicated above, before placing the bars together in this manner, clips 15 and 16 can be respectively located in the indented portions 22 of each bar so that when the bars are brought together, the clips are positioned to receive wedged portion 26 of each bar, which functions to open the legs 29 of the clips, the wedge portions moving into the space between the leg portions as the bars are brought together. Initially, as the wedge 26 engages the extensions 30, the bulge 27 of the wedge moves into the area between the extensions, aided by the inward incline of the extensions, to spread legs 29 apart, and to seat behind the bulge 27. This process serves to initially loosely secure the bars together so that the installer can then apply a tool (not shown) to the bars to bring the bars together against the resilience of bushings 21. The workman compresses each end of the bars together on resilient bushings 21 until the extensions 30 of the legs of each clip snap over and engage ledges 28 of the opposite bar. When the extensions snap over and engage the ledges, a relatively loud snap or click sound is heard by the workman so that he knows the spacer is properly installed and secured to the conductors. If, for some reason, the extensions of the clip do not snap over and engage the ledges of the opposed bar, the resilience of bushings 21 causes the bars to spring apart so that the installer knows the bars are not properly attached to the conductors. This is true even when one end of the spacer is properly installed. If the clip at the other end of the spacer fails to engage ledges 28 of the bars, the bars spring apart at this end so that the installer is clearly made aware of the failure of the clip to properly engage the ledges. The above initial engagement of the clips with bulges 27 leaves the bars quite loose on the conductors so that it is clear to the installer that the spacer is not properly installed.

The resilience of bushings 21, which are under compression by virtue of the clips properly clipped to the spacer bars, functions to maintain the clips under a tensile load such that the clips do not become loose. In addition, the conforming configuration of the clips to that of the indented portion of the bars, with their rounded corners (at 25), operates to maintain substantially the entire extent of the clips in tension so that no individual portion of the clips is subject to forces that are excessive over those of other portions of the clip, i.e., the entire clip is uniformly placed under tensile load to ensure a strong, reliable clipping action.

In addition, the inward incline of planar ledges 28 of the bars and the planar extensions 30 of the clips, together with the manufactured incline of the legs of the clips, ensure positive locking of the clips on the body of the bars, the clip extensions 30 biting into the body of the bars.

With the spacer bars of the invention properly attached to a conductor bundle, such as shown in FIG. 1 of the drawing, no separate inspection thereof is necessary, i.e. either the spacer is properly attached, as indicated above, by the installer or it is not attached at all. In this manner, the spacer cannot be mounted on the line in any sort of a loose or inadequate manner to deceive an inspector of the installation.

In FIG. 4 of the drawings, an embodiment 33 of the invention is shown in which a single bar 34 is employed to space conductors 20, the spacing bar having an integral clamp half 36 at each end thereof. The spacing bar 34 is clamped to the conductor 20 by the clamp halves 36 in cooperation with clamp halves 38 respectively pivotally connected to clamp halves 36, by a hinge pin 39, at a location generally diametrically opposed to bar 34. Each clamp half 38 has an elongated, integral extension or bar 40 which extends inwardly toward bar 34 when the bars are clamped to the conductors.

In a manner similar to the bars of FIGS. 1 and 2, the spacing bar 34 and the clamp bars 40 have, respectively, indented portions 42 and 44 for receiving clips 15 and 16 in the manner described above in connection with FIGS. 1 and 2. The cross sectional configuration of bar 34 and clamp extensions can thus be the same as 22 and 24 (respectively) of the bars of FIGS. 1 and 2 at the location of indents 42 and 44, with indent 44 providing a wedge 47, as seen in FIG. 5.

Like the bars 12 and 14 described above, spacer bar 34 and clamp bar 40, with their integral clamp halves 36 and 38, can be low cost cast units generally requiring no machining operations.

The installation of spacer 33 is similar to that described above in connection with spacer 10. More particularly, the clamp halves 38 of spacer 33 are first swung away from clamp halves 36 (about hinge pin 39), and the clamp halves 36 laid, respectively, on conductors 20, with bar 34 extending between the conductors. Clamp halves 38 are then returned to a position opposed to clamp halves 36, about each conductor 20, by grasping bar 40 and rotating it about the hinge pin. As bar 40 approaches its associated clip (15 or 16) the wedge 47 of bar 40 spreads apart the clip in the manner described above in connection with spacer 10. When the inward extensions 30 of each clip engage and seat over ledges 28 of each bar 40, a snap is heard telling the installer that the end of the bar is properly secured to its associated conductor. The resilience of bushings 21, along with the spring characteristics of the material of the bars extending between each clip and the hinge pin, provides ample tensile force on the clip to maintain it in securing position.

Another advantage of the device of FIGS. 4 and 5 is the capability of adjusting the mechanical advantage of the clamp assembly. It is, for example, sometimes desirable to adjust the loads under which a conductor will slip within the clamp assembly. In addition, in cold weather, the material of the clamp bushings is hard so that additional force is needed to bring the clamp halves together about the bushings. With the device 33, adjustment in leverage is easily effected by simply providing bearing and retention slots (indented portions 42 and 44) on bars 34 and 40 that are substantially longer than the width of the clips. Within the length dimension of such slots, the clips 15 and 16 are located to choose the appropriate leverage and hence the appropriate clamping force.

The embodiments of the present invention have therefore been described in terms of the use of bushed clamps, the resilience of the bushings being employed to maintain substantial tension force on clips 15 and 16.

However, users of spacing devices sometime desire metal-to-metal clamping for a variety of reasons. For example, if the material of elastomer bushings tends to deteriorate with the passage of time so that electrical and mechanical contact between the clamps and conductors is adversely affected, direct gripping of the conductor by the clamp is desired. Also, the semiconducting characteristic of the bushing material is believed by some to provide a less than desirable conductive path between the conductor and spacer to maintain the conductors spaced by the spacer at the same electrical potential.

To provide users with the advantages of the spacers of the present invention while simultaneously providing metal-to-metal contact between the conductors and the clamps of the spacers, a clip structure 50, as depicted in FIG. 6, is provided in which the central portion of the clip is extended laterally in opposed directions (providing a T configuration) to provide a leaf spring structure 52, the remainder of the clip (and the clamp halves to be clipped thereby) being the same as described above in connection with FIGS. 1 to 5.

The clip 50 of FIG. 6 provides four basic functions; namely, (1) ample travel capability of the leg extensions 30 of the clip to effect engagement with the ledges of the clamp half, via deflection of leaf spring 52; (2) adequate clamping action, via the force of the leaf spring, to forcefully grip the conductor; (3) adequate tension imposed on the vertical legs of the clip to prevent the clip from working loose; and (4) the provision of a means to accommodate manufacturing tolerances in the clamp halves, in the cross section and diameter of the conductors, and in the clip itself, by providing a range of deflection and travel of the clip legs.

Figure 8:
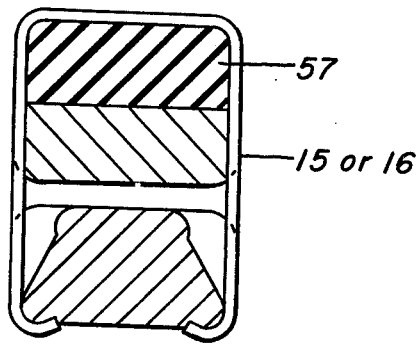
FIGS. 7 and 8 are elevation views of two alternatives to the clip shown in FIG. 6.
Figure 7:
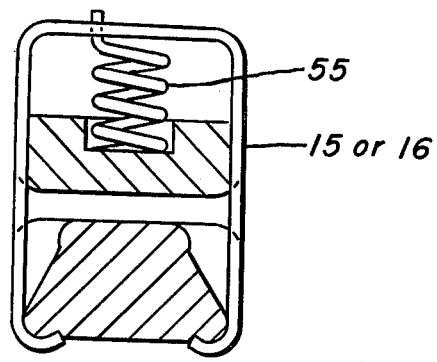

FIGS. 7 and 8 are elevation views of two alternatives to the clip of FIG. 6, FIG. 7 showing the use of an open wound, helical spring 55 located between the upper surface of the upper clamping bar and the inside surface of clip 15 or 16. In FIG. 8, spring 55 is replaced by a resilient elastomer body 57. In either embodiment, the resilience of spring 55 or elastomer body 57 functions in a manner similar to that of the leaf spring of FIG. 6 to secure clamping structures to associated electrical conductors.

While the invention has been described in terms of preferred embodiments, the claims appended hereto are intended to encompass all embodiments which fall within the spirit of the invention.

What is claimed is:

1. A boltless device for spacing at least two parallel, spaced-apart conductors, the device comprising rigid clamping structures adapted to be secured to the two conductors, with at least one of the structures having two outwardly facing planar ledges inclined toward the other clamping structure when the structures are placed together in face-to-face relation, two resilient clips adapted to secure said clamping structures together on said conductors at the location of the inclined planar ledges, each of said clips being made from flat metal, resilient stock and having a configuration which provides a center portion disposed to engage one of the clamping structures, and two integral leg portions extending from the center portion to engage the other clamping structure and having planar configurations that tend to prevent rotation of the clip on the one clamping structure, the other of said clamping structures having the inclined planar ledges, the leg portions of said clip having opposed, planar extensions adapted to extend over and respectively engage the inclined planar ledges.

2. The boltless device of claim 1 in which the legs of each clip are inclined inwardly toward each other when the clip is in a relaxed condition but are forced apart in the process of clipping the clamping structures together such that each clip makes a noticeable sound when the extensions of the legs of each clip attempt to come together over and engage the planar ledges of the clamping structures.

3. The boltless device of claim 1 in which the configuration of each clip is generally U-shaped and closely conforms to the clamping structures when the clip is disposed thereon.

4. The boltless device of claim 3 including resilient bushings located to engage the conductors between the conductors and the clamping structures, said bushings being effective to maintain substantially uniform tension on the extent of each clip when the clamping structures are secured to the conductors and the clips are secured to the clamping structures.

5. The boltless device of claim 4 in which the resilience of the bushings is effective to instantly open the clamping structures if the extensions of the legs of the clip fail to engage the ledges of the clamping structures.

6. The boltless device of claim 1 in which each clip has a generally T-shape configuration, the T-shape configuration providing a leaf spring structure having a resilience sufficient to tightly clip the clamping structures together when the clip is applied to the structures in a conductor clamping manner.

7. The boltless device of claim 1 in which the inclined planar ledges provided on the clamping structures are elongated to provide a choice in locating the clips on the structures and thus a means to adjust the force at which clamping structures clamp the conductors.

8. The boltless device of claim 1 in which the clamping structures respectively comprise two elongated rigid bars having a clamp half at each end for clamping to the conductors, said bar structures having substantially identical configurations.

9. The boltless device of claim 1 in which each of the clamping structures includes cooperating half portions for clamping to a respective conductor, and, means pivotally connecting the cooperating half portions together.

10. The boltless device of claim 1 in which the clamping structure having the planar ledges is provided with means to initially engage the planar extensions of the legs of an associated clip before the clip is disposed in full clipping engagement with the clamping structure.

11. The boltless device of claim 1 in which each clip has associated therewith a resilient member located between the clip and one of the clamping structures.

* * * * *